United States Patent [19]

Glassmeyer

[11] 4,249,783
[45] Feb. 10, 1981

[54] WHEEL HUB STRUCTURE WITH BEARING LUBRICATION

[75] Inventor: John J. Glassmeyer, Glenwood, Ill.

[73] Assignee: Pullman Incorporated, Chicago, Ill.

[21] Appl. No.: 11,826

[22] Filed: Feb. 13, 1979

Related U.S. Application Data

[63] Continuation-in-part of Ser. No. 838,517, Oct. 3, 1977, abandoned.

[51] Int. Cl.³ .............................................. F16C 33/66
[52] U.S. Cl. .................................. 308/187; 184/11 A
[58] Field of Search ............... 308/16, 17, 187, 207 R, 308/211; 184/11 A, 13 R

[56] References Cited

U.S. PATENT DOCUMENTS

| 1,234,080 | 7/1917 | Peacock | 308/187 |
| 2,052,897 | 9/1936 | Sanders | 308/187 |
| 2,648,576 | 8/1953 | Horger | 308/187 |
| 3,061,387 | 10/1962 | Laws | 308/187 |
| 3,111,195 | 11/1963 | Wilkinson | 184/6 |
| 3,425,760 | 2/1969 | Gordon | 308/207 R |
| 3,642,327 | 2/1972 | Walther | 308/187 |

Primary Examiner—Richard R. Stearns
Attorney, Agent, or Firm—Stephen D. Geimer

[57] ABSTRACT

An arrangement for providing lubrication to the outer bearing of a wheel hub having inner and outer bearing assemblies from an internal annular lubricant reservoir in the wheel hub housing. A lubricant carrying tube positioned within the wheel hub housing has an inlet which receives lubricant from the reservoir and an outlet directed toward the outer bearing. Lubricant flows through the tube and is supplied to the outer bearing assembly as the wheel rotates.

13 Claims, 6 Drawing Figures

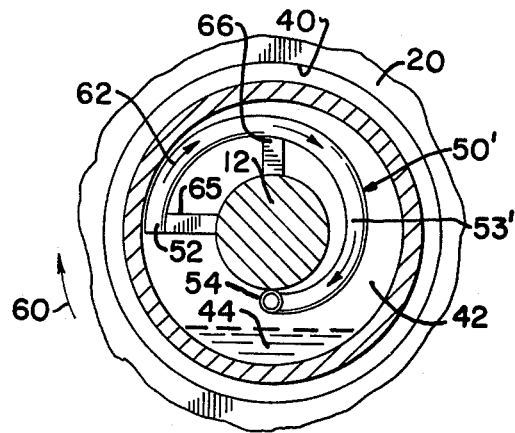
FIG-5-
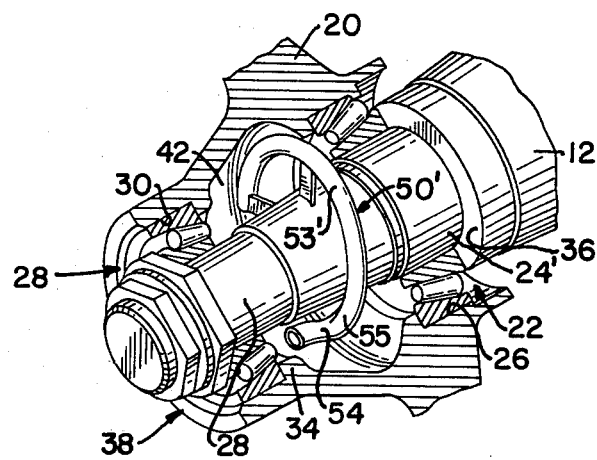
FIG-6-

WHEEL HUB STRUCTURE WITH BEARING LUBRICATION

CROSS-REFERENCE TO PRIOR APPLICATION

This application is a continuation-in-part of U.S. patent application Ser. No. 838,517, filed Oct. 3, 1977, now abandoned.

BACKGROUND OF THE INVENTION

1. Field of the Invention

The invention relates to hub structures for wheels and particularly to the lubrication of bearings in such hub structures.

2. Description of the Prior Art

A prior art dual wheel hub structure indicated generally at 10 in FIG. 4 is rotatably mounted on an axle 12 and has a radially outward extending flange secured to a brake drum 14, an inner wheel 16 and an outer wheel 18 by bolts 17 and nuts 19. The hub structure 10 includes a hub housing 20, a bearing indicated generally at 22 between a cylindrical secton 24' of the axle 12 and an inside cylindrical bearing surface 26 of the housing 20 adjacent the inner end of the housing, and an outer bearing indicated generally at 24 between a cylindrical section 28 of the axle 12 and an inside cylindrical bearing surface 30 of the hub housing 20 adjacent its outer end. Inner annular lips 32 and 34 of the housing 20 engage the inward facing edges of the outside races of the respective bearings 22 and 24 to maintain their axial spacing, and a shoulder 36 on the axle 12 and a nut arrangement indicated generally at 38 secured on the end of the axle engage the outer edges of the inside races of the respective bearings 22 and 24 to secure the hub structure 10 on the axle 12. The inner bearing 22 and the inner section 24 of the axle 12 have larger diameters than the diameters of the outer bearing 24 and the axle section 28 to facilitate the assembly and disassembly of the hub structure. Between the lips 32 and 34 as well as between the bearings 22 and 24, an inner surface 40 of the hub housing 20 is formed or recessed radially outward relative to the bearing surfaces 26 and 30 and is tapered inwardly from the inner end portion of the hub housing 20 to the outer end thereof. The surface 40 forms an annular lubricant chamber or reservoir 42 which has its greatest depth or diameter adjacent the lip 32 and the bearing 22 for containing oil or lubricant 44 (shown as a toroid in FIG. 4 produced by centrifugal force in the bottom or outer periphery of the annular chamber 42 during high speed rotation of the hub structure 10). Additionally, conventional sealing means (not shown) are provided for sealing the inner and outer ends of the hub structure 10.

Due to leakage and the difference in the diameters of the bearings 22 and 24, the oil level within the chamber 42 is often reduced to a level where the outer bearing 24 receives no lubricant during wheel rotation even though the inner bearing 22 may be adequately lubricated; and thus in the absence of constant replenishment of the lubricant 44, the outer bearing 24 tends to become dry and to fail which can result in more serious consequences than just failure of the bearing.

U.S. Pat. No. 1,234,080 discloses a wheel hub with spiral flanges within a lubricant chamber to provide a positive feed of the lubricant, while U.S. Pat. No. 3,425,760 discloses a wheel assembly with radial vanes on a spacer element surrounding the axle for agitating and aiding in distribution of a lubricant. U.S. Pat. No. 2,474,283 shows a wheel mounting for a brake drum and dual wheels on a trailer, truck or the like. U.S. Pat. No. 2,052,897 shows an arrangement for lubricant distribution including a plurality of relatively short conduits.

Additionally, various other lubrication systems for bearings in various apparatus such as electric motors and turbine motors are illustrated in U.S. Pat. Nos. 3,090,656, 3,111,195, and 3,325,232; the U.S. Pat. No. 3,111,195 showing a stationary pipe for scooping lubricant from an annular sump chamber rotated with a shaft. However, such lubrication systems are generally too complex, too costly or otherwise unsuitable for hub structures such as those employed in dual truck or trailer wheel assemblies.

SUMMARY OF THE INVENTION

The invention is summarized in a wheel hub structure rotatably carried by an axle and including an annular hub housing adapted to be secured to a wheel; the hub housing having a first inside bearing surface adjacent to an inner end of the hub housing and having a second inside bearing surface adjacent to an outer end of the hub housing, inner and outer bearings between the axle and the respective first and second bearing surfaces to support the hub housing; the hub housing having an annular lubricant chamber between the first and second bearing surfaces; the annular lubricant chamber being formed radially outward relative to the inner and outer bearings; and a tube having one end aligned with the bottom of the annular lubricant chamber and having a second end directed toward at least one of the inner and outer bearings for supplying lubricant to the one bearing.

An object of the invention is to construct a wheel hub structure having improved lubrication of bearings.

Another object of the invention is to direct oil from the bottom of an annular lubricant cavity in a wheel hub housing toward an outer bearing to insure lubrication of the outer bearing.

One advantage of the invention is that a tube installed in the wheel hub structure suffices to substantially improve lubrication of an outer wheel bearing.

One feature of the invention is the alignment of a first open end of a tube with the bottom of the annular lubricant chamber and the alignment of the other end of the tube parallel the axle toward a bearing.

Another feature of the invention is the extension of the tube along a substantial segment of the outer periphery of the annular lubricant chamber to pick up a substantial quantity of oil to provide lubrication to the outer bearing and to substantially subdivide the lubricant chamber.

Other objects, advantages and features of the invention will be apparent from the following description of the preferred embodiment taken in conjunction with the accompanying drawings.

BRIEF DESCRIPTION OF THE DRAWINGS

FIG. 5 is a cross-section view similar to FIG. 2 disclosing a modification.

FIG. 6 is a perspective view similar to FIG. 3 showing the modification.

DESCRIPTION OF THE PREFERRED EMBODIMENT

Figure 1:
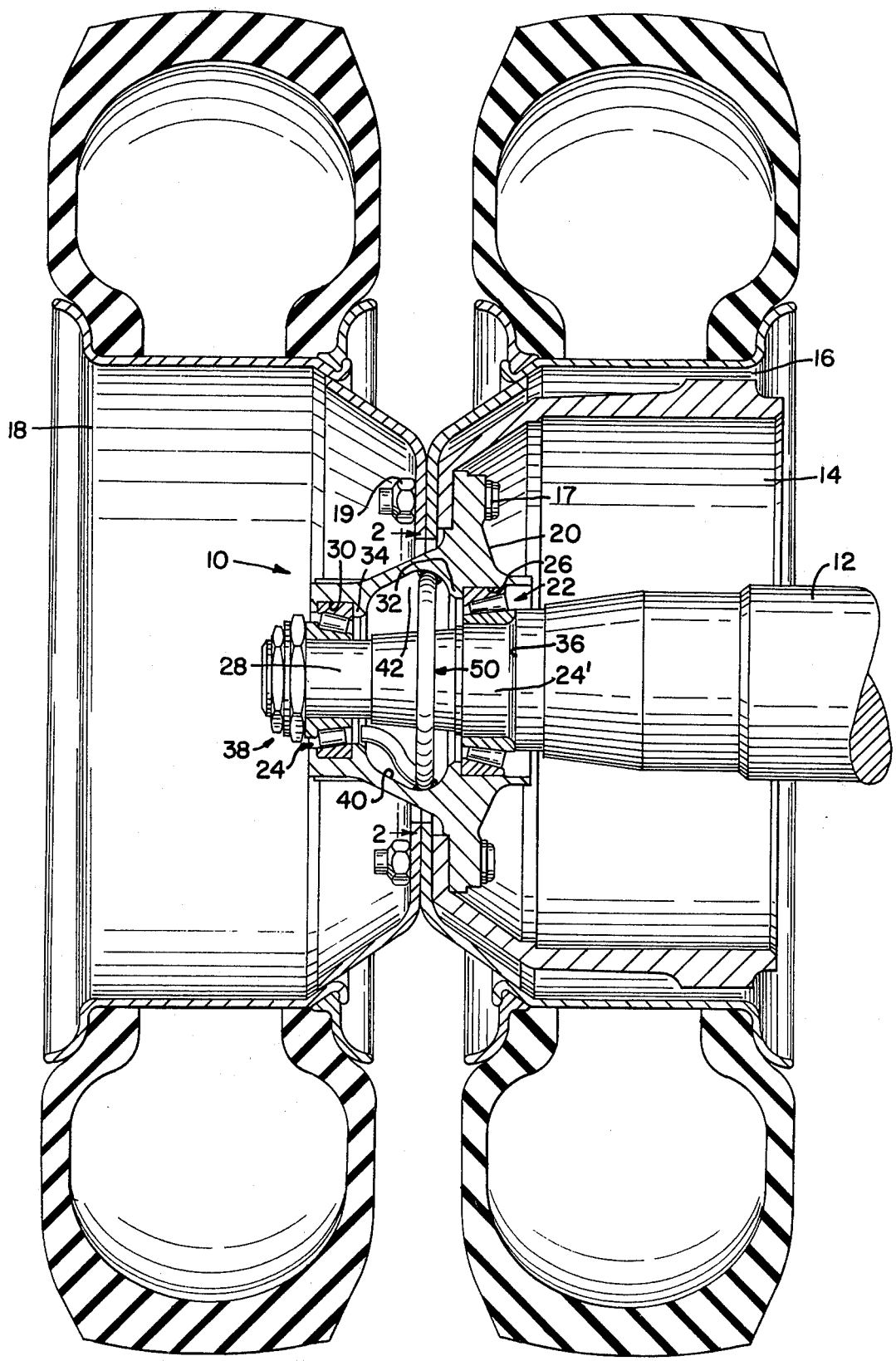
FIG. 1 is a cross-section view from the back of a left dual wheel assembly for a vehicle.
Figure 2:
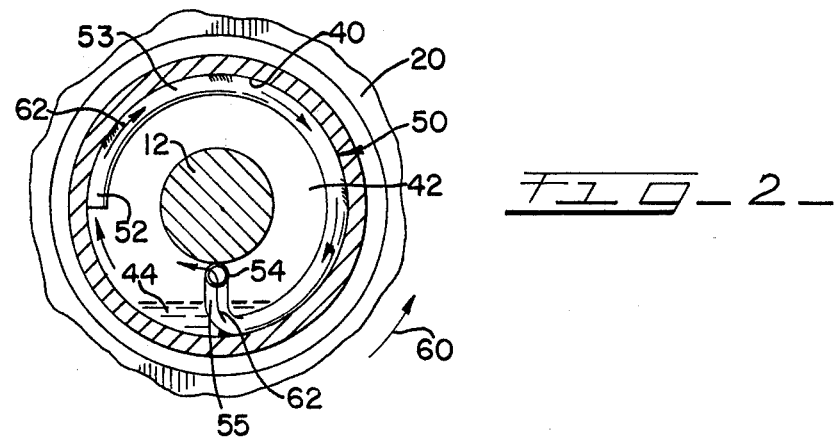
FIG. 2 is a cross-section view taken along line 2—2 of FIG. 1.
Figure 3:
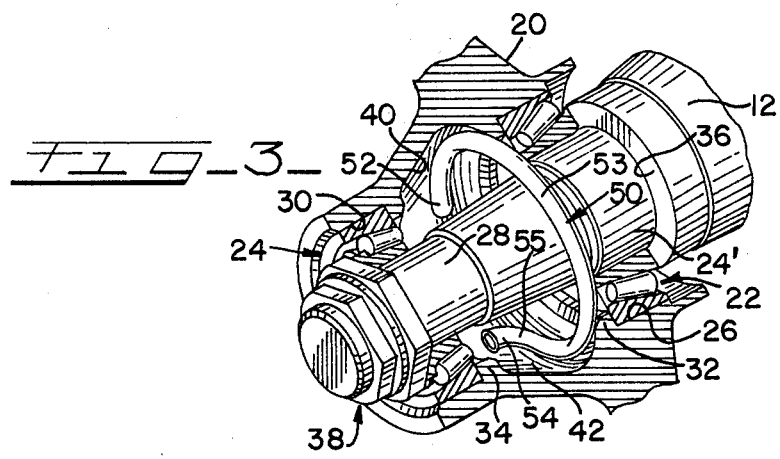
FIG. 3 is a perspective view with parts broken away of the hub structure in the wheel assembly of FIG. 1.
Figure 4:
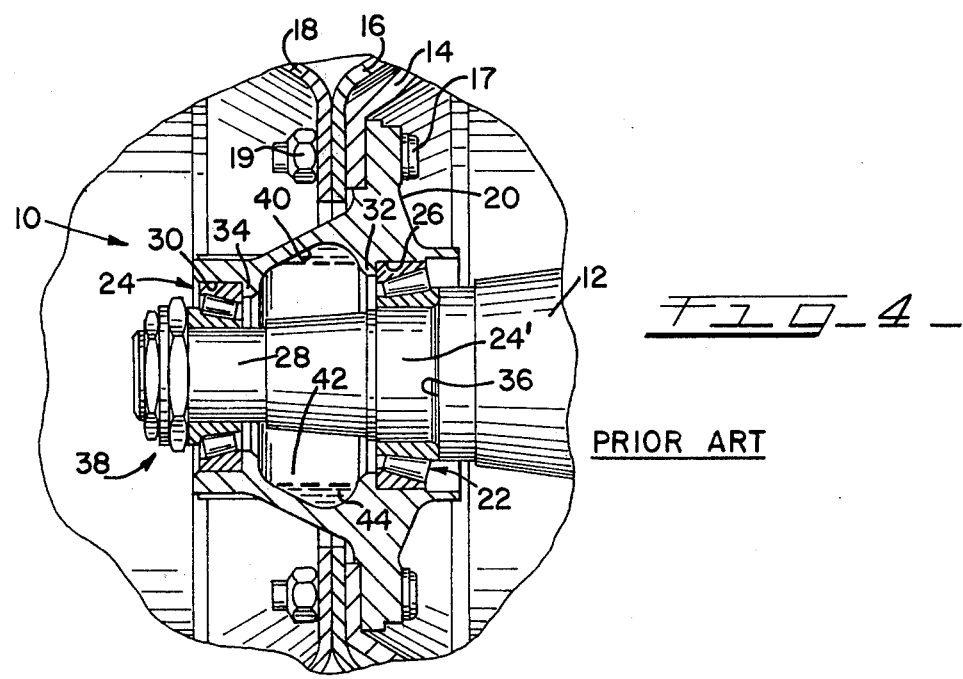
FIG. 4 is a cross-section view, similar to FIG. 1, of the prior art wheel hub structure described hereinbefore.

The invention is embodied in a dual wheel structure, as shown in FIG. 1 for a vehicle such as a trailer or a truck. Parts of this structure are identified by the same numerals used to identify parts in the prior art structure shown in FIG. 4 indicating that such commonly identified parts are substantially similar. The wheel structure differs from the prior art by the inclusion of a tube indicated generally at 50 secured inside the hub housing 20. As shown in FIGS. 2 and 3, inlet end 52 of the tube 50 is aligned with the bottom or outer periphery of the annular lubricant chamber or reservior 42, and an outlet end 54 of the tube 50 is directed toward the outer bearing 24. An arcuate section or portion 53 of the tube 50 adjacent the inlet 52 extends along a substantial arcuate portion of the outer periphery of the annular chamber 42, such as a 270° arcuate portion. This arcuate tube section 53 essentially subdivides the lubricant chamber 42 into two portions. As best seen in FIG. 1, the subdivided portion of reservoir 42 adjacent the outer bearing 24 is substantially larger than the subdivided portion adjacent the inner bearing 22 since tube section 53 is positioned approximately twice as far from outer bearing 24 as from inner bearing 22. From the section 53, the tube 50 has a portion 55 curved radially inward toward the axle 12. The outlet 54 of the tube is bent or curved from the portion 55 to extend generally perpendicular to the section of tube within the chamber 42 or to extend parallel to the axis of rotation and the axle 12. The outlet 54 extends to a point sufficiently close to the bearing 24 so that oil discharged out of the outlet 54 impinges upon the bearing 24.

In operation of the dual wheel structure shown in FIGS. 1, 2 and 3, rotation of the hub structure 10 in the direction as illustrated by the arrow 60 in FIG. 2 at slow speeds causes oil from a puddle 44 in the bottom of the annular chamber 42 to enter the inlet 52 of the tube 50. As rotation continues, the oil received in the inlet opening 52 of the tube 50 under the force of gravity advances through the length of the tube 50 and is discharged out of the outlet 54, as indicated by the arrows 62, bathing the bearing 24 to lubricate the same. At high speeds when the oil 44 forms a toroid in the extreme outer periphery of the annular chamber 42, a lesser angular velocity of movement of the oil 44 than the angular velocity of the hub 10, such as during acceleration of the vehicle, causes oil to flow through the tube 50 and out the outlet 54. Thus, the wheel structure is substantially less subject to failure since lubrication of the bearing 24 is substantially improved. Additionally, as best seen in FIG. 1, the positioning of the arcuate tube section 53 substantially closer to inner bearing 22 than to outer bearing 24 causes the portion of reservoir 42 adjacent to the inner bearing 22 to act as a lubricant-entrapping channel. Arcuate tube section 53 acts as a dam to entrap lubricant in this portion of reservoir 42, and the lubricant entrapped therein effects lubrication of inner bearing 22. As seen in FIG. 2, arcuate tube section 53 does not extend about the entire periphery of reservoir 42, thereby providing communication between the subdivided portions of reservoir 42 so as accommodate the flow of excess lubricant from the lubricant-entrapping channel.

While it is preferred that the inlet 52 of the tube 50 extend in the direction of forward movement of the wheel as illustrated in FIG. 2, the direction could be reversed to provide lubrication of the outer bearing during reverse movement of the wheel or during deceleration from a high speed. The tube 50 could also be modified to lubricate the bearing 22 as an alternate or in addition to lubrication of bearing 24.

The modified Embodiment of the Invention

FIGS. 5 and 6 disclose a modified form of the invention wherein the tube 50' is mounted on the axle 12. The same reference characters for the same parts as the preferred embodiment will apply. In this embodiment the tube 50' is supported on the axle 12 by means of spoke-like support member 65 and 66, rather than on the inside of the hub housing 20.

As the hub structure in FIGS. 5 and 6, rotates in the direction of the arrow 60, lubricant from the puddle 44 is forced upwardly into the tube inlet 52 and by gravity and the momentum of the lubricant travels through section 53' to the outlet 54 for lubricating the bearing 24. In this modification however the installation of the tube would require that it be done in sections or must be flexible to provide for possible installation.

Since many variations, modifications and changes in detail may be made to the described wheel hub structure, it is intended that all matter in the foregoing description and shown in the accompanying drawings be interpreted as illustrative and not in a limiting sense.

I claim:

1. A wheel hub structure rotatably carried by an axle and comprising
   an annular hub housing adapted to be secured to a wheel;
   said hub housing having a first inside bearing surface adjacent to an inner end of the hub housing and having a second inside bearing surface adjacent to an outer end of the hub housing;
   inner and outer bearings between the axle and the respective first and second bearing surfaces to support the hub housing;
   said hub housing having an annular lubricant reservior between the first and second bearing surfaces;
   said annular lubricant reservior being formed radially outward relative to the inner and outer bearings; and
   a tube having a first circumferentially extending portion essentially subdividing said reservoir and an inlet end aligned with the bottom of said annular lubricant reservoir and having an outlet end directed toward at least one of said bearings for supplying lubricant to said one bearing, the circumferentially extending portion of said tube being positioned more closely to the other bearing than to said one bearing and thereby providing a lubricant entrapping channel with the housing open at one side to the other bearing for directing lubricant thereto.

2. A wheel hub structure as claimed in claim 1,
   wherein the tube is secured to the inside of the hub housing and said first portion extending along a substantial portion of the outer periphery of the annular lubricant reservoir and being interrupted to provide communication between said lubricant-entrapping channel and said lubricant reservoir to accommodate flow of excess lubricant from said channel.

3. A wheel hub structure as claimed in claim 2, wherein the tube has a second portion extending angularly to said first portion in a direction generally parallel to said axle.

4. A wheel hub structure as claimed in claim 3, wherein said first portion of said tube is essentially arcuate and is radially spaced from said axle and extends about 270° within said annular lubricant reservoir.

5. A wheel hub structure as claimed in claim 2, wherein the first portion of the tube extends in the same direction as the direction of forward rotation of the hub structure.

6. A wheel hub structure as claimed in claim 1, wherein one bearing has a substantially smaller diameter than the other bearing, and the outlet end of the tube is directed toward the smaller bearing.

7. A wheel hub structure as claimed in claim 6 wherein
the tube is secured to the inside of the hub housing and has an arcuate section adjacent to the inlet end of the tube extending along a substantial portion of the outer periphery of the annular lubricant chamber,
the tube has a portion curved radially inward from the arcuate section, and
the outlet end of the tube is bent from the radially inwardly curved portion to extend substantially parallel to the axle.

8. A wheel hub structure rotatably carried by axle as claimed in claim 1,
wherein the tube is secured to the axle and has a section adjacent to the inlet of the tube extending along a substantial portion of the outer periphery of the annular lubricant chamber.

9. A wheel hub structure rotatably carried by an axle and comprising
an annular hub housing adapted to be secured to a wheel;
said hub housing having a first bearing surface adjacent to one end of said hub housing and having a second bearing surface adjacent to the other end of said hub housing;
first and second bearings between said axle and the respective first and second bearing surfaces;
said hub housing having an annular lubricant reservoir between said first and second bearing surfaces;
said annular lubricant reservoir being formed radially outwardly relative to said first and second bearings; and
a tube having an inlet end generally aligned with the outermost periphery of said lubricant reservoir, a first essentially arcuate portion circumferentially extending from said inlet about a substantial portion of the periphery of said lubricant reservoir and thereby essentially subdividing said reservoir, and an outlet end directed at the first of said bearings for providing lubricant thereto, said first portion of said tube being positioned substantially closer to said second bearing than to said first bearing and thereby forming a lubricant-entrapping channel with said hub housing adjacent said second bearing for directing lubricant thereto.

10. A wheel hub structure as claimed in claim 9, wherein said lubricant-entrapping channel is in communication with the remainder of said lubricant reservoir to accommodate flow of excess lubricant from said channel.

11. A wheel hub structure as claimed in claim 10, wherein said tube has a second portion positioned in angular relation relative to said first portion and extending in a direction generally parallel to said axle.

12. A wheel hub structure as claimed in claim 9, wherein said first portion is radially spaced from said axle and extends approximately 270° within said lubricant reservoir.

13. A wheel hub structure as claimed in claim 9, wherein said first arcuate portion is positioned approximately twice as far from said first bearing as from said second bearing.

* * * * *